(12) United States Patent
Matsusaka et al.

(10) Patent No.: US 10,215,299 B2
(45) Date of Patent: Feb. 26, 2019

(54) FLUID CONTROL VALVE HAVING YOKE-SUPPORTED CORE

(71) Applicant: AISIN SEIKI KABUSHIKI KAISHA, Kariya-shi (JP)

(72) Inventors: Masanobu Matsusaka, Chita (JP); Tadayoshi Sato, Chita-gun (JP)

(73) Assignee: AISIN SEIKI KABUSHIKI KAISHA, Kariya, Aichi-Ken (JP)

( * ) Notice: Subject to any disclaimer, the term of this patent is extended or adjusted under 35 U.S.C. 154(b) by 332 days.

(21) Appl. No.: 15/106,756

(22) PCT Filed: Dec. 9, 2014

(86) PCT No.: PCT/JP2014/082568
§ 371 (c)(1),
(2) Date: Jun. 20, 2016

(87) PCT Pub. No.: WO2015/093347
PCT Pub. Date: Jun. 25, 2015

(65) Prior Publication Data
US 2018/0149281 A1 May 31, 2018

(30) Foreign Application Priority Data

Dec. 20, 2013 (JP) ................................ 2013-264106

(51) Int. Cl.
*F16K 31/06* (2006.01)
*F16K 27/02* (2006.01)
(Continued)

(52) U.S. Cl.
CPC ........ *F16K 27/029* (2013.01); *F16K 31/0655* (2013.01); *F16K 31/0675* (2013.01);
(Continued)

(58) Field of Classification Search
CPC .............. F16K 27/029; F16K 31/0675; F16K 31/0655; H01F 7/1638; F01P 2070/10; F01P 2007/146
(Continued)

(56) References Cited

U.S. PATENT DOCUMENTS

| 1,403,930 A | * | 1/1922 | Wick | ....................... G10B 3/06 |
| | | | | 251/129.2 |
| 3,203,447 A | * | 8/1965 | Bremner | ............. F16K 31/0627 |
| | | | | 137/595 |

(Continued)

FOREIGN PATENT DOCUMENTS

| JP | S57-1879 A | 1/1982 |
| JP | 10-213257 A | 8/1998 |

(Continued)

OTHER PUBLICATIONS

Office Action (Notification of Reason for Refusal) dated Aug. 29, 2017, by the Japanese Patent Office in corresponding Japanese Patent Application No. 2013-264106, and an English Translation of the Office Action. (8 pages).

(Continued)

*Primary Examiner* — John Bastianelli
(74) *Attorney, Agent, or Firm* — Buchanan Ingersoll & Rooney PC

(57) ABSTRACT

A fluid control valve facilitates a reduction in size while securing a valve closing force for shutting off the flow of a fluid. The fluid control valve includes a plate-shaped stationary yoke (9) in which a passage hole (3) for a fluid is provided and which has a valve seat (4) around the passage hole (3), a magnetic valve disc (7) capable of controlling the flow rate of the fluid flowing through the passage hole (3) by coming into contact with and separating from the valve seat (4), and an electromagnetic coil (10) that is attached to the stationary yoke (9), with a coil axis (Y) extending in a (Continued)

direction different from a moving direction of the valve disc (7), so as to generate a magnetic field in the stationary yoke (9) and cause the valve disc (7) to be attracted to the valve seat (4).

6 Claims, 6 Drawing Sheets

(51) Int. Cl.
*H01F 7/16* (2006.01)
*F01P 7/14* (2006.01)

(52) U.S. Cl.
CPC ...... *H01F 7/1638* (2013.01); *F01P 2007/146* (2013.01); *F01P 2070/10* (2013.01)

(58) Field of Classification Search
USPC ............... 251/129.16, 129.21; 335/281, 297
See application file for complete search history.

(56) References Cited

U.S. PATENT DOCUMENTS

| | | | | |
|---|---|---|---|---|
| 5,048,564 A | * | 9/1991 | Gaiardo | F16K 27/003 137/599.07 |
| 5,810,329 A | * | 9/1998 | Baron | F16K 31/0606 137/82 |
| 6,311,951 B1 | * | 11/2001 | Samulowitz | F16K 31/0682 251/129.16 |
| 6,415,817 B1 | * | 7/2002 | Krimmer | F02M 25/0836 137/550 |
| 2013/0020513 A1 | | 1/2013 | Matsusaka et al. | |

FOREIGN PATENT DOCUMENTS

| | | |
|---|---|---|
| JP | 2002-340219 A | 11/2002 |
| JP | 2006-118701 A | 5/2006 |
| JP | 2012-112529 A | 6/2012 |
| JP | 2013-525653 A | 6/2013 |

OTHER PUBLICATIONS

European Search Report dated Nov. 3, 2016, by the European Patent Office, in corresponding European Patent Application No. 14872848.8 (6 pages).

International Search Report (PCT/ISA/210) dated Mar. 3, 2015, by the Japanese Patent Office as the International Searching Authority for International Application No. PCT/JP2014/082568.

Written Opinion (PCT/ISA/237) dated Mar. 3, 2015, by the Japanese Patent Office as the International Searching Authority for International Application No. PCT/JP2014/082568.

* cited by examiner

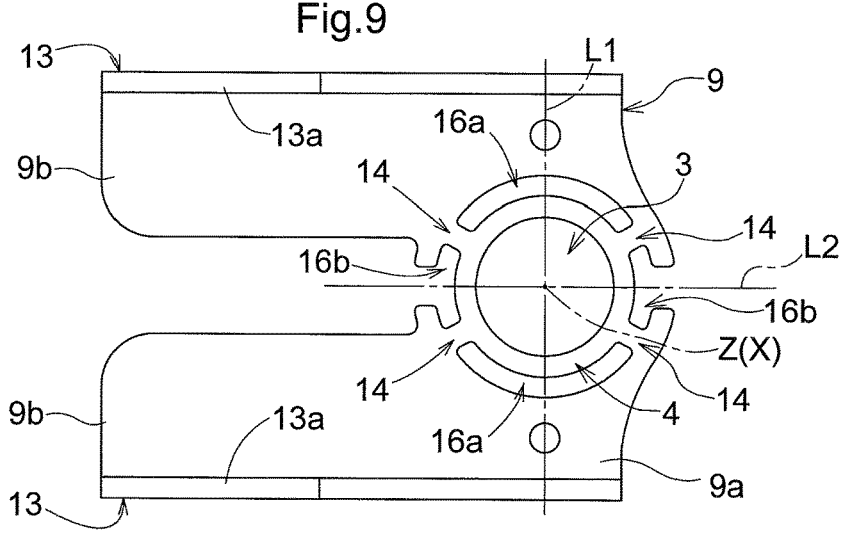
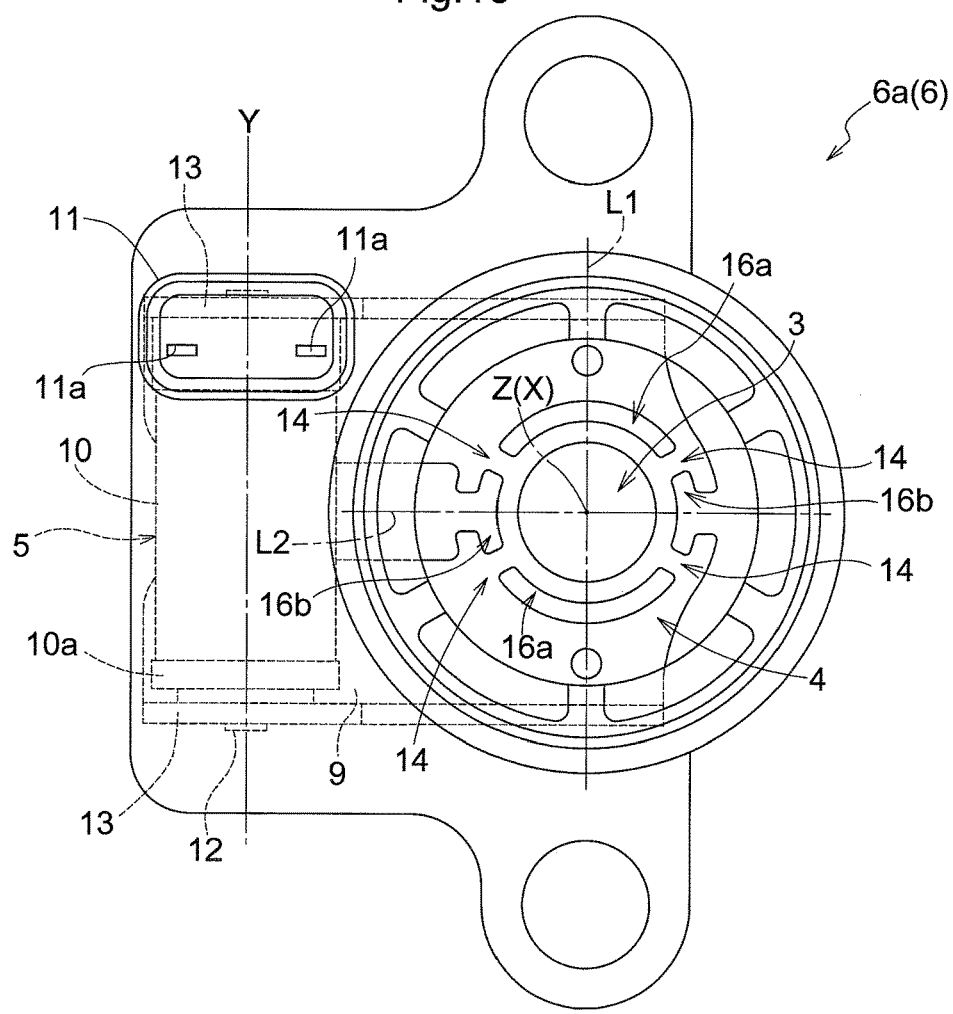

FLUID CONTROL VALVE HAVING YOKE-SUPPORTED CORE

TECHNICAL FIELD

The present invention relates to a fluid control valve having a valve seat around a passage hole for a fluid and including a magnetic valve disc capable of controlling the flow rate of the fluid flowing through the passage hole by being brought into contact with and separated from the valve seat by the operation of an electromagnetic coil.

BACKGROUND ART

Patent Document 1 discloses a fluid control valve including a cylindrical base member in which a passage hole for a fluid is concentrically provided and which has a valve seat around the passage hole, a magnetic valve disc capable of controlling the flow rate of the fluid flowing through the passage hole by coming into contact with and separating from the valve seat, and an electromagnetic coil wound around a bobbin, the valve disc being constituted by a movable core that moves in the direction of the axis of the coil on an inner circumferential side of the bobbin.

Patent Document 2 discloses a fluid control valve including a cylindrical stationary yoke in which a passage hole for a fluid is concentrically provided and which has a valve seat around the passage hole, a magnetic valve disc capable of controlling the flow rate of the fluid flowing through the passage hole by coming into contact with and separating from the valve seat, and an electromagnetic coil concentrically attached to the inside of the stationary yoke, with the axis of the coil extending in the same direction as a moving direction of the valve disc, so as to generate a magnetic field in the stationary yoke and cause the valve disc to be attracted to the valve seat.

PRIOR ART DOCUMENTS

Patent Documents

Patent Document 1: JP 2002-340219A
Patent Document 2: JP 2013-525653A

SUMMARY OF INVENTION

Technical Problem

A solenoid can generate a large electromagnetic force that is proportional to (the number of turns of the electromagnetic coil)×(the electric current). However, if the winding diameter is increased, the length of the coil wire increases, resulting in an increase in the electric resistance, and thus, when the same voltage is applied, the electric current decreases, and accordingly the electromagnetic force decreases. In the case where the winding inner diameter is large, in order to prevent an increase in the electric resistance, the use of a coil wire having a large outer diameter is necessary, but in that case, the size of the electromagnetic coil increases. For this reason, from the standpoint of generating a required electromagnetic force using a small electromagnetic coil, a small winding diameter is desirable.

In the fluid control valve disclosed in Patent Document 1, the valve disc is constituted by the movable core that moves in the direction of the axis of the coil on the inner circumferential side of the bobbin. This imposes a restriction in reducing the winding diameter of the electromagnetic coil wound around the bobbin, and thus it is difficult to reduce the size of the electromagnetic coil.

In the fluid control valve disclosed in Patent Document 2, the passage hole is concentrically provided inside the cylindrical stationary yoke in which the electromagnetic coil is concentrically provided. This imposes a restriction in reducing the winding diameter of the electromagnetic coil provided on an outer circumferential side of the passage hole, and thus as in the case of the fluid control valve in Patent Document 1, it is difficult to reduce the size of the electromagnetic coil.

Furthermore, since the valve seat is provided on one end side of the stationary yoke, and the valve disc is installed so as to oppose the valve seat from one end side with respect to the direction of the axis of the coil, the valve disc and the electromagnetic coil are lined up in the direction of the axis of the coil, and this makes it difficult to achieve a reduction in size.

The present invention was made in view of the above-described circumstances, and it is an object thereof to provide a fluid control valve that facilitates a reduction in size.

Solution to Problem

A feature of a fluid control valve according to the present invention is that the fluid control valve includes a plate-shaped stationary yoke in which a passage hole for a fluid is provided and which has a valve seat around the passage hole, a magnetic valve disc capable of controlling a flow rate of the fluid flowing through the passage hole by coming into contact with and separating from the valve seat, and an electromagnetic coil that is attached to the stationary yoke, with a coil axis of the electromagnetic coil extending in a direction that is different from a moving direction of the valve disc, so as to generate a magnetic field in the stationary yoke and cause the valve disc to be attracted to the valve seat.

In the fluid control valve with this configuration, the passage hole for the fluid is provided in the plate-shaped stationary yoke, the stationary yoke also includes the valve seat around the passage hole, and the electromagnetic coil is attached to the stationary yoke, with the coil axis extending in the direction that is different from the moving direction of the valve disc.

Thus, it is possible to move the valve disc toward the valve seat by energizing the electromagnetic coil without the need to install the valve disc inside the electromagnetic coil or provide the passage hole inside the electromagnetic coil.

The fluid control valve with this configuration makes it possible to arrange the valve disc and the electromagnetic coil without the need to line up the valve disc and the electromagnetic coil in the coil axis direction, and thus, it is easy to reduce the size of the fluid control valve.

Another feature of the present invention is that the electromagnetic coil is attached with the coil axis extending along a plane that is perpendicular to the moving direction of the valve disc.

Arranging the electromagnetic coil with its coil axis extending in the direction perpendicular to the moving direction of the valve disc, that is, in the radial direction of the passage hole as in this configuration, makes it easy to further reduce the size of the fluid control valve.

Another feature of the present invention is that both end portions of a core installed inside the electromagnetic coil are respectively supported by a pair of support portions that are integrally formed on the stationary yoke.

With this configuration, a magnetic flux of the electromagnetic coil flows into the stationary yoke via one of the support portions and flows out of the stationary yoke via the other support portion. Thus, it is possible to provide a magnetic circuit through which the magnetic flux efficiently passes.

Thus, the size of the electromagnetic coil can be made more compact.

Another feature of the present invention is that magnetic throttling portions are provided in portions of the stationary yoke through which a magnetic flux passes along a circumferential edge of the passage hole.

With this configuration, magnetic saturation in those portions of the stationary yoke through which the magnetic flux passes along the circumferential edge of the passage hole is promoted, and thus the magnetic flux is more likely to pass through those portions on the valve disc side. Therefore, it is easy to move the valve disc responsively with small power consumption through energization of the electromagnetic coil.

Another feature of the present invention is that the magnetic throttling portions are arranged at respective positions that are point-symmetrical to each other, where a center of the passage hole is the center of symmetry.

With this configuration, positions through which the magnetic flux passes on the valve disc side are dispersed along the circumferential edge of the passage hole, and thus the valve disc is likely to move in a stable orientation.

Another feature of the present invention is that the stationary yoke and the valve disc are formed of a magnetic material, and the valve disc is attracted to the valve seat under a magnetic attractive force generated between the stationary yoke and the valve disc.

With this configuration, due to a magnetic field being generated in the stationary yoke, a magnetic attractive force from the valve seat directly acts on the valve disc, and thus the attraction force between the valve seat and the valve disc increases. Consequently, the valve disc can be stably kept in a closed state.

Another feature of the present invention is that a maximum length of the valve disc in a flowing direction of the fluid is smaller than a maximum length of the valve disc in a width direction that is perpendicular to the flowing direction.

With this configuration, the valve disc has a flat plate shape, and a region of the flow path that is occupied by the valve disc is small. Thus, a compact fluid control valve can be configured.

BRIEF DESCRIPTION OF DRAWINGS

FIG. 9 is a plan view showing a stationary yoke according to a third embodiment.

FIG. 10 is a plan view showing a housing main body according to the third embodiment.

DESCRIPTION OF EMBODIMENTS

Hereinafter, embodiments of the present invention will be described based on the drawings.

First Embodiment

Figure 1:
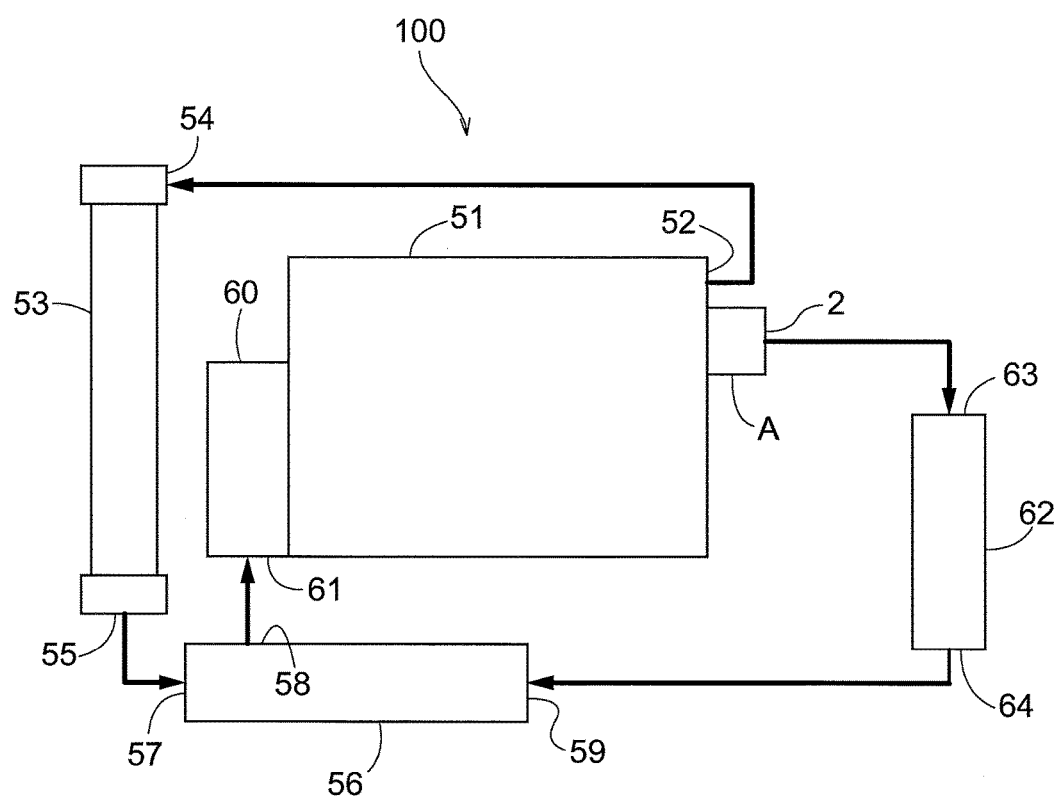
FIG. 1 is an explanatory diagram of an engine cooling system.

FIG. 1 shows an engine cooling system 100 equipped with a coolant stop valve A for a vehicle as an example of a fluid control valve according to the present invention.

In the engine cooling system 100, a coolant outlet port 52 of an engine 51 is connected to an inlet port 54 of a radiator 53, and an outlet port 55 of the radiator 53 is connected to an inlet port 57 of a thermostat valve 56. An outlet port 58 of the thermostat valve 56 is connected to a suction port 61 of a water pump 60 that is driven by the engine 51. A discharge port (not shown) of the water pump 60 is connected to a coolant inlet port (not shown) of the engine 51.

A heating outlet port (not shown) of the engine 51 is connected to an inlet port 1 (see FIGS. 3 and 4) of the coolant stop valve A. An outlet port 2 of the coolant stop valve A is connected to an inlet port 63 of a heater core 62, and an outlet port 64 of the heater core 62 is connected to a bypass inlet port 59 of the thermostat valve 56. The bypass inlet port 59 is in communication with the outlet port 58.

In the engine cooling system 100, a coolant (an example of a fluid) is circulated by driving of the water pump 60 in such a manner that the coolant heated within the engine 51 is cooled in the radiator 53 and then returned to the engine 51 via the thermostat valve 56.

At a low temperature, the thermostat valve 56 is maintained in a closed state, and the coolant does not flow to the radiator 53. Thus, the coolant passing through an internal flow path of the engine 51 is circulated in such a manner as to flow through the coolant stop valve A, the heater core 62, the thermostat valve 56, and then return to the engine 51.

Figure 2:
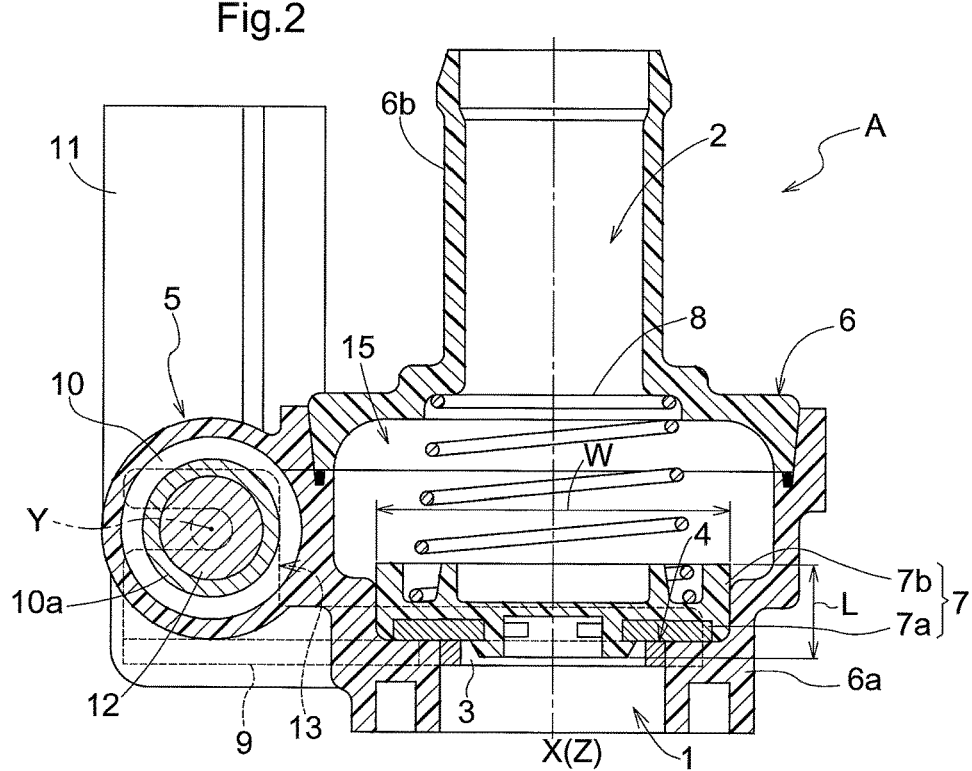
FIG. 2 is a cross-sectional view showing a fluid control valve in a closed state.
Figure 3:
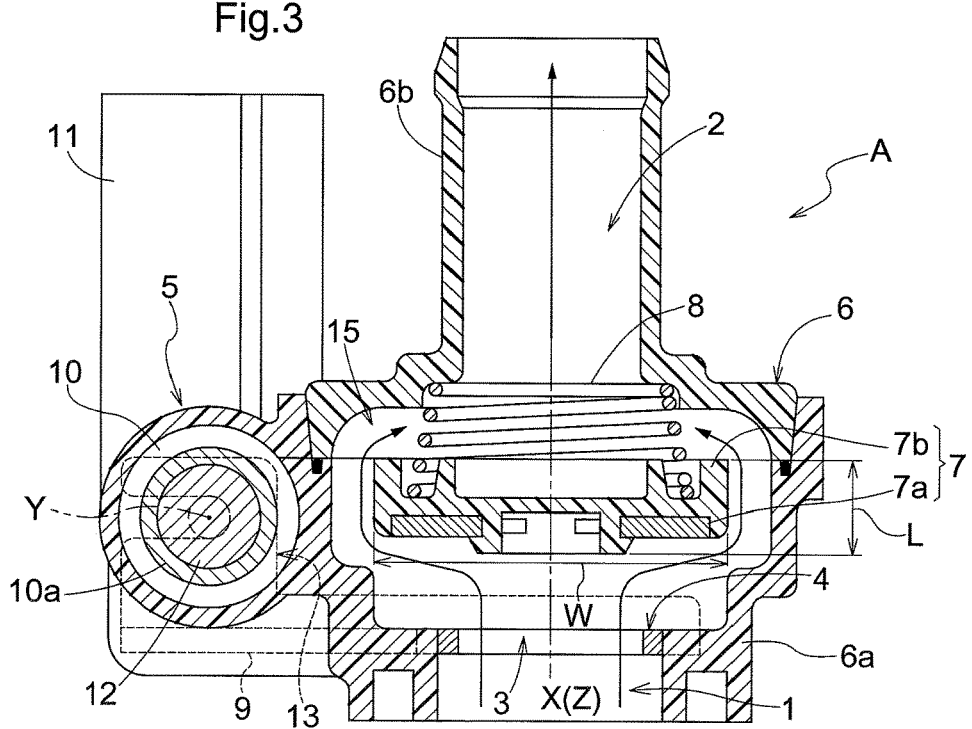
FIG. 3 is a cross-sectional view showing the fluid control valve in an open state.
Figure 4:
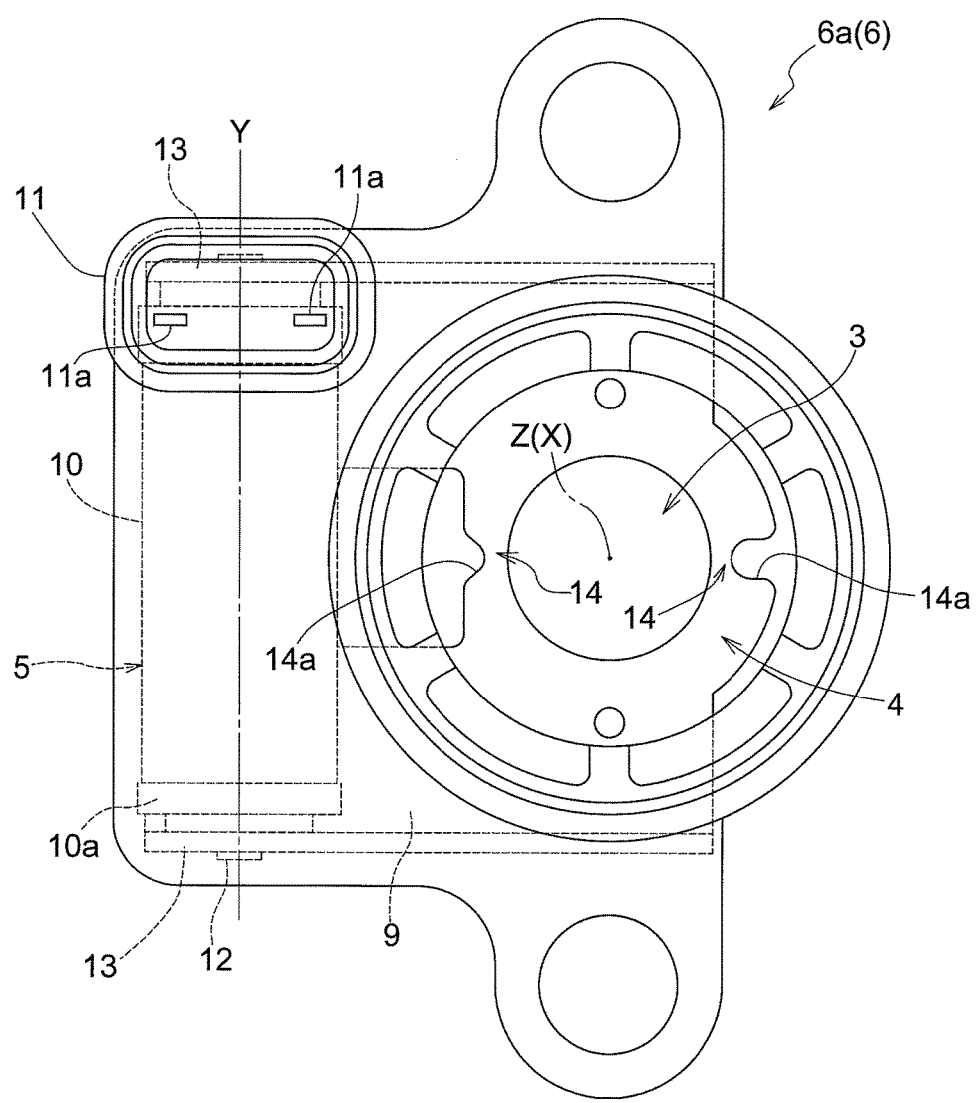
FIG. 4 is a plan view showing a housing main body.

As shown in FIGS. 2 to 4, the coolant stop valve A includes a housing 6 in which a passage hole 3 for the coolant, a valve seat 4, and a solenoid 5 are provided, a magnetic valve disc 7 capable of controlling the flow rate of the coolant flowing through the passage hole 3 by coming into contact with and separating from the valve seat 4, and a coil spring 8 (an example of an urging member) that urges the valve disc 7 toward the valve seat 4 (in a closing direction). The valve disc 7 is excited by the energization of the solenoid 5 so as to move toward the valve seat 4 (in the closing direction).

The housing 6 is constituted by a housing main body 6a made of resin, in which the inlet port 1 into which the coolant (an example of the fluid) from the heating outlet port of the engine 51 flows, the coolant passage hole 3 through which the inlet port 1 and the outlet port 2 communicate with each other, the valve seat 4 provided around the passage hole 3, and the solenoid 5 are provided, and an outlet flow path forming portion 6b made of resin, in which the outlet port 2 connected to the inlet port 63 of the heater core 62 is provided. The housing main body 6a and the outlet flow path forming portion 6b are integrally connected to each other such that the axis of the inlet port 1 and the axis of the outlet port 2 are aligned on the same flow path axis X.

Figure 5:
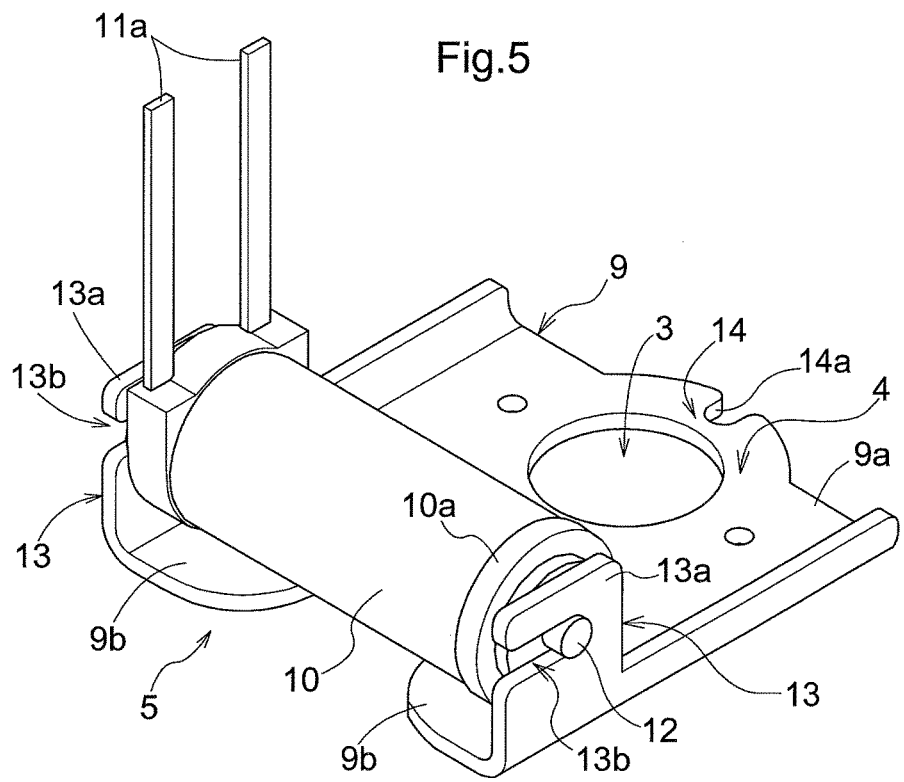
FIG. 5 is a perspective view showing a solenoid.
Figure 6:
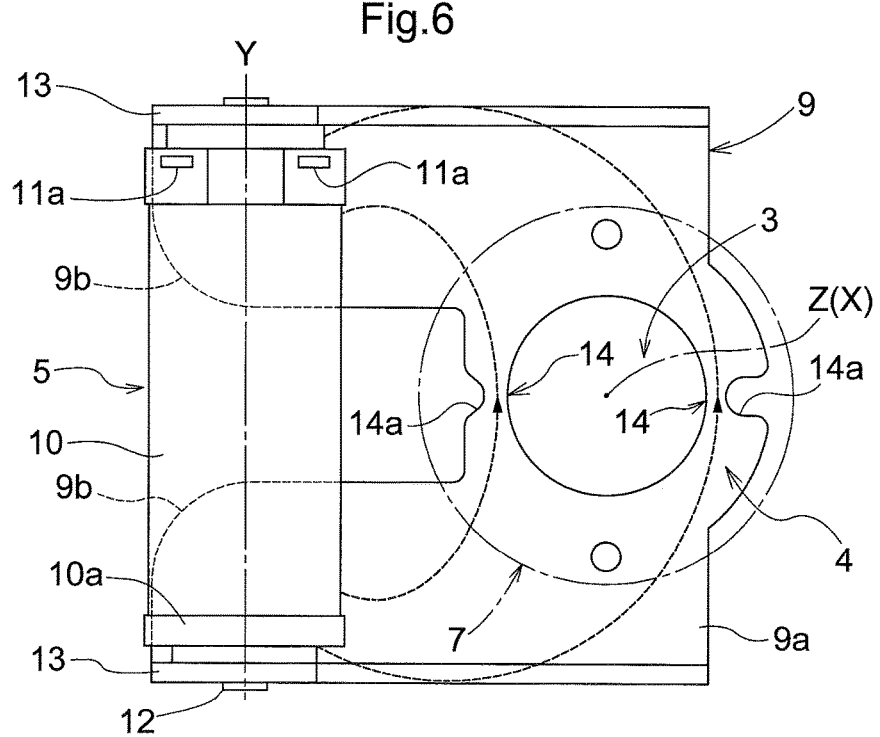
FIG. 6 is a plan view showing the solenoid.

As shown in FIGS. 5 and 6, the solenoid 5 includes a plate-shaped stationary yoke 9 that is formed of a magnetic material such as iron, an electromagnetic coil 10 that is attached to the stationary yoke 9 so that when energized, the electromagnetic coil 10 generates a magnetic field in the stationary yoke 9 and causes the valve disc 7 to be attracted to the valve seat 4, and a socket 11a that has connecting terminals 11a electrically connecting the electromagnetic coil 10 to an external driving circuit (not shown).

The stationary yoke 9 integrally has a base plate portion 9a in which the passage hole 3 having a circular shape is formed and a pair of extended plate portions 9b that are extended from respective positions in the base plate portion 9a on opposite sides of the passage hole 3 such that the extended plate portions 9b are parallel to each other. The stationary yoke 9 is formed to have a substantially "U" shape in plan view. A portion of the stationary yoke 9 around the passage hole 3 is provided as the valve seat 4.

In addition, the solenoid 5 is formed in the housing main body 6a by insert molding such that the portion of the base plate portion 9a that constitutes the valve seat 4 is exposed to the outside.

The electromagnetic coil 10 is configured by winding an insulating conductor around a bobbin 10a formed of a non-magnetic material such as resin, and a core 12 formed of a magnetic material such as iron and having a shaft-like shape is concentrically installed inside the electromagnetic coil 10, that is, on the inner circumferential side of the bobbin 10a.

Both end portions of the core 12 are supported by a pair of support portions 13 that are integrally formed on the respective extended plate portions 9b such that the support portions 13 oppose each other in a direction that is parallel to the direction in which the extended plate portions 9b sandwich the passage hole 3 in the base plate portion 9a.

Each of the support portions 13 is configured by forming a bent piece 13a by bending a side edge portion of the corresponding extended plate portion 9b at right angles, and forming a slit 13b in that bent piece 13a. The end portions of the core 12 are fitted into the respective slits 13b from a radial direction of the core and supported therein.

Therefore, a ring-shaped magnetic path of a magnetic flux generated by the electromagnetic coil 10 is configured by the core 12, the pair of extended plate portions 9b, and the base plate portion 9a.

The electromagnetic coil 10 is attached to the stationary yoke 9 via the core 12, with a coil axis Y extending in a direction that is different from the moving direction (direction along the flow path axis X) of the valve disc 7.

Specifically, the electromagnetic coil 10 is attached to the stationary yoke 9 with the coil axis Y extending in an imaginary plane that is perpendicular to the moving direction of the valve disc 7.

In those portions of the stationary yoke 9 through which the magnetic flux passes along the circumferential edge of the passage hole 3, a pair of magnetic throttling portions 14 are provided at respective positions that are point-symmetrical to each other, where the center (position at which the flow path axis X passes through the passage hole 3) Z of the passage hole 3 is the center of symmetry.

Specifically, as shown in FIG. 6, in the portion of the base plate portion 9a that constitutes the valve seat 4, "U"-shaped notches 14a that open outward are formed in portions opposing each other in a direction that is perpendicular to the coil axis Y and that passes through the center Z of the passage hole 3. In this manner, the magnetic throttling portions 14 in which the cross-sectional area is sharply reduced and which have a small width are provided.

The valve disc 7 is configured by forming an annular strip member 7a formed of a magnetic material such as iron in a resin portion 7b by insert molding such that a surface of the annular strip member 7a is exposed to the valve seat 4 side. As shown in FIGS. 2 and 3, the valve disc 7 is accommodated in a valve disc accommodating space 15 that is formed in a connecting portion between the housing main body 6a and the outlet flow path forming portion 6b.

Moreover, as shown in FIGS. 2 and 3, a maximum length L of the valve disc 7 in the direction (flowing direction of the fluid) of the flow path axis X is smaller than a maximum length W of the valve disc 7 in a width direction perpendicular to the flow path axis X. Thus, the valve disc 7 has a flat plate shape, and a region of the flow path that is occupied by the valve disc 7 is small, so that the coolant stop valve A can be made compact.

The coil spring 8 is installed in the valve disc accommodating space 15 so as to extend between the valve disc 7 and the outlet flow path forming portion 6b.

Therefore, when the solenoid 5 is de-energized, the fluid pressure of the coolant generated by the operation of the water pump 60 enables the valve disc 7 to move in an opening direction against the urging force of the coil spring 8 in the closing direction.

The following is a description of an opening/closing operation of the coolant stop valve A.

When the engine 51 is stopped, the water pump 60 is stopped, and the solenoid 5 is de-energized; however, the valve disc 7 is urged to come into contact with the valve seat 4 by the urging force of the coil spring 8, and thus the coolant stop valve A is kept in the closed state shown in FIG. 2.

When the engine 51 is started, driving of the water pump 60 is started, and so the fluid pressure of the coolant acts on the valve disc 7; however, the valve disc 7 is excited by energization of the solenoid 5, so that the valve disc 7 is pressed against the valve seat 4 by the attractive force generated by the energization of the solenoid 5 and the urging force of the coil spring 8, and the coolant stop valve A is kept in the closed state shown in FIG. 2. That is to say, the valve disc 7 is attracted to the valve seat 4 under the magnetic attractive force generated between the stationary yoke 9 and the valve disc 7.

During usage of a heater, when the solenoid 5 is de-energized, the fluid pressure of the coolant pushes the valve disc 7 up from the valve seat 4 against the urging force of the coil spring 8, so that the coolant stop valve A is kept in the open state shown in FIG. 3, and the coolant heated by the engine 51 flows to the heater core 62.

Second Embodiment

Figure 7:
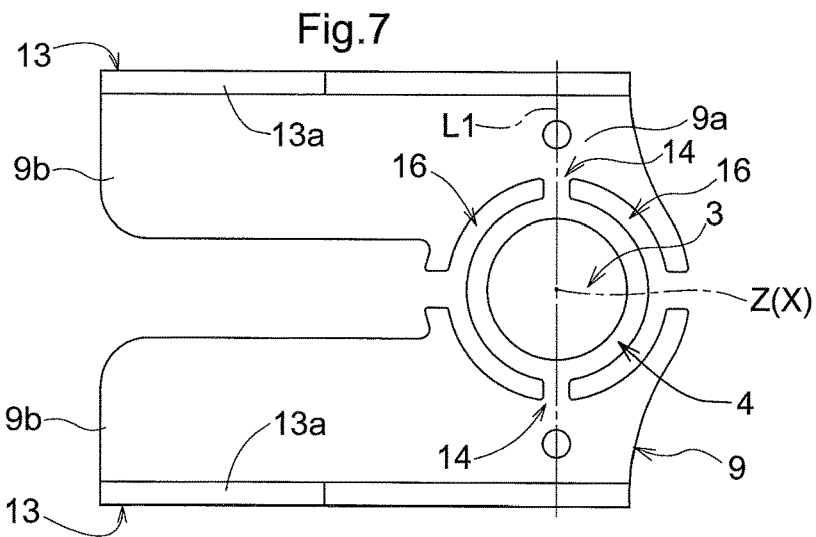
FIG. 7 is a plan view showing a stationary yoke according to a second embodiment.
Figure 8:
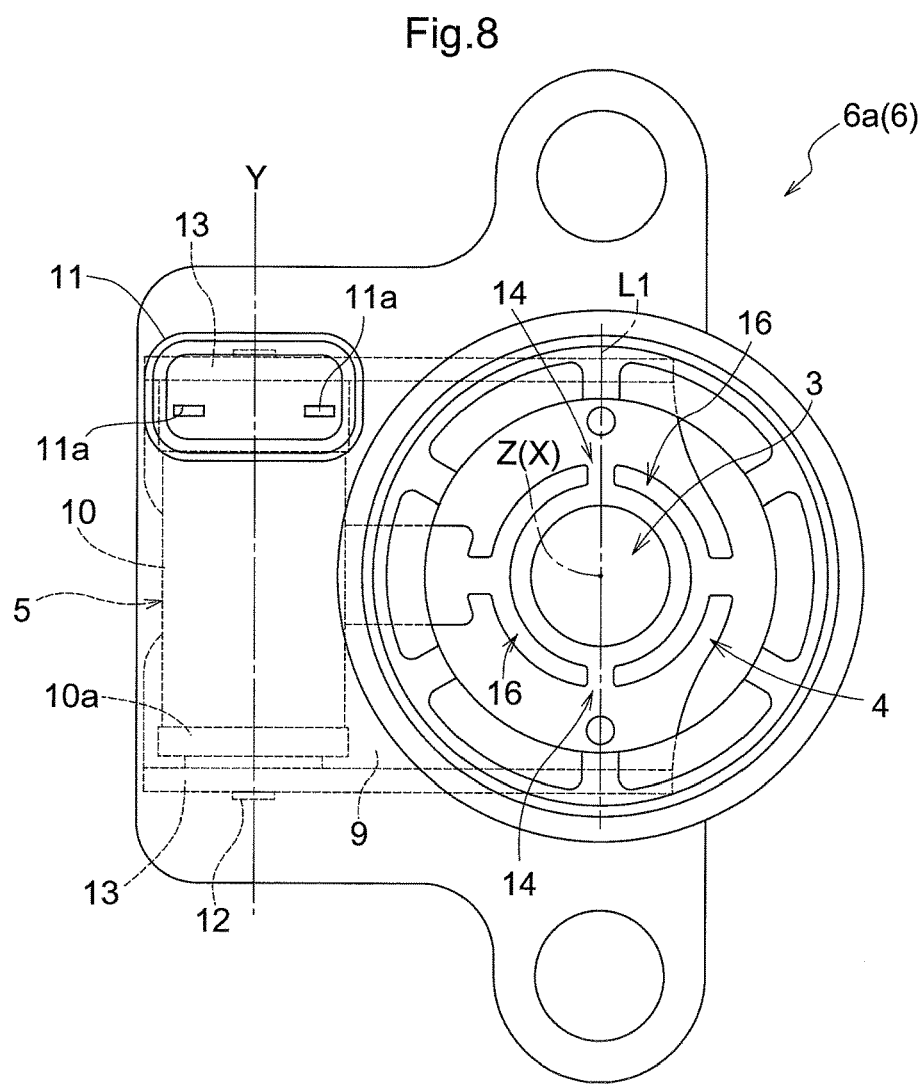
FIG. 8 is a plan view showing a housing main body according to the second embodiment.

FIGS. 7 and 8 show another embodiment of the present invention.

This embodiment differs from the first embodiment in terms of the arrangement and shape of the magnetic throttling portions 14.

That is to say, in the portion of the base plate portion 9a that constitutes the valve seat 4, a pair of circular arc-shaped cut grooves 16 concentrically surrounding the passage hole 3 are formed so as to be symmetrical to each other with respect to a line segment L1 that is parallel to the coil axis Y and that passes through the center Z of the passage hole 3, and an intermediate portion of each cut groove 16 with respect to a longitudinal direction of the cut groove 16 opens to an outer lateral side of the base plate portion 9a.

In addition, narrow portions of the base plate portion 9a that are left between the adjacent cut grooves 16 are provided as the magnetic throttling portions 14, which are arranged at respective positions that are point-symmetrical to each other, where the center Z of the passage hole 3 is the center of symmetry.

The other configurations are the same as those of the first embodiment.

Third Embodiment

FIGS. 9 and 10 show another embodiment of the present invention.

This embodiment differs from the first embodiment in terms of the arrangement and shape of the magnetic throttling portions 14.

That is to say, in the portion of the base plate portion 9a that constitutes the valve seat 4, a pair of first circular arc-shaped cut grooves 16a concentrically surrounding the passage hole 3 and a pair of second circular arc-shaped cut grooves 16b having a shorter length than the first cut grooves 16a and concentrically surrounding the passage hole 3 are formed lined up in a circumferential direction, the first and second cut grooves having the same groove width and the same curvature, and an intermediate portion of each second cut groove 16b with respect to the longitudinal direction thereof opens to an outer lateral side of the base plate portion 9a.

In addition, narrow portions of the base plate portion 9a that are left at four locations between the first cut grooves 16a and the second cut grooves 16b are provided as the magnetic throttling portions 14, which are arranged at respective positions that are point-symmetrical to each other, where the center Z of the passage hole 3 is the center of symmetry.

The pair of first cut grooves 16a are formed so as to be symmetrical to each other with respect to a line segment L2 that is perpendicular to the coil axis Y and that passes through the center Z of the passage hole 3.

The pair of second cut grooves 16b are formed so as to be symmetrical to each other with respect to the line segment L1, which is parallel to the coil axis Y and passes through the center Z of the passage hole 3.

The other configurations are the same as those of the first embodiment.

OTHER EMBODIMENTS

1. In the fluid control valve according to the present invention, the electromagnetic coil may be attached to the stationary yoke with its coil axis extending in a direction that obliquely crosses the moving direction of the valve disc.

2. In the fluid control valve according to the present invention, the magnetic throttling portions may be configured by providing, in those portions of the stationary yoke through which the magnetic flux passes along the circumferential edge of the passage hole, thin portions in which the thickness of the stationary yoke is smaller than in their surrounding portions.

3. In the fluid control valve according to the present invention, the valve disc may be urged in the closing direction by gravity.

4. The fluid control valve according to present invention can be used in various applications such as a flow path switching valve.

REFERENCE SIGNS LIST

3 Passage hole
4 Valve seat
7 Valve disc
9 Stationary yoke
10 Electromagnetic coil
12 Core
13 Support portion
14 Magnetic throttling portion
L Maximum length
W Maximum length
X Flow path axis (flowing direction of fluid)
Y Coil axis
Z Center of passage hole

The invention claimed is:

1. A fluid control valve comprising:
a plate-shaped stationary yoke in which a passage hole for a fluid is provided and which has a valve seat around the passage hole;
a magnetic valve disc capable of controlling a flow rate of the fluid flowing through the passage hole by coming into contact with and separating from the valve seat; and
an electromagnetic coil that is attached to the stationary yoke, with a coil axis of the electromagnetic coil extending in a direction that is different from a moving direction of the valve disc, so as to generate a magnetic field in the stationary yoke and cause the valve disc to be attracted to the valve seat,
wherein both end portions of a core installed inside the electromagnetic coil are supported by a pair of support portions that are integrally formed on the stationary yoke.

2. The fluid control valve according to claim 1, wherein the electromagnetic coil is attached with the coil axis extending along a plane that is perpendicular to the moving direction of the valve disc.

3. The fluid control valve according to claim 1, wherein magnetic throttling portions are provided in portions of the stationary yoke through which a magnetic flux passes along a circumferential edge of the passage hole.

4. The fluid control valve according to claim 3, wherein the magnetic throttling portions are arranged at positions that are point-symmetrical to each other, where a center of the passage hole is the center of symmetry.

5. The fluid control valve according to claim 1, wherein the stationary yoke and the valve disc are formed of a magnetic material, and the valve disc is attracted to the valve seat under a magnetic attractive force generated between the stationary yoke and the valve disc.

6. The fluid control valve according to claim 1, wherein a maximum length of the valve disc in a flowing direction of the fluid is smaller than a maximum length of the valve disc in a width direction that is perpendicular to the flowing direction.

* * * * *